United States Patent [19]

Fukushima et al.

[11] Patent Number: 4,825,308
[45] Date of Patent: Apr. 25, 1989

[54] DATA PROCESSING SYSTEM

[75] Inventors: Masahito Fukushima, Hitachi; Eiji Matsuda, Takahagi; Shigeru Matsuoka; Hitoshi Yonenaga, both of Hitachi, all of Japan

[73] Assignee: Hitachi, Ltd., Tokyo, Japan

[21] Appl. No.: 12,176

[22] Filed: Feb. 9, 1987

[30] Foreign Application Priority Data

Feb. 7, 1986 [JP] Japan .................. 61-23831

[51] Int. Cl.$^4$ .............................................. G11B 5/09
[52] U.S. Cl. ........................................ 360/46; 360/26; 364/900
[58] Field of Search .............. 360/51, 26, 46; 364/200 MS File, 900 MS File

[56] References Cited

U.S. PATENT DOCUMENTS

| | | | |
|---|---|---|---|
| 3,736,568 | 5/1973 | Snook | 364/900 |
| 3,877,069 | 4/1975 | Altonji et al. | 360/26 |
| 3,913,721 | 10/1975 | Kaplow et al. | 364/900 |
| 4,054,947 | 10/1977 | Shanks et al. | 364/900 |
| 4,112,501 | 9/1978 | Onnestam | 364/900 |
| 4,244,008 | 1/1981 | Holt | 360/45 |
| 4,330,844 | 5/1982 | Dubuc | 364/900 |
| 4,477,848 | 10/1984 | McWhirter et al. | 360/27 |
| 4,626,935 | 12/1986 | Gorbachev et al. | 360/51 |
| 4,646,173 | 2/1987 | Kammeyer et al. | 360/51 |
| 4,717,973 | 1/1988 | McWhirter | 360/31 |

Primary Examiner—Eddie P. Chan
Assistant Examiner—Debra A. Chun
Attorney, Agent, or Firm—Antonelli, Terry & Wands

[57] ABSTRACT

A data processing system in which a phase judging data portion is added to the head of data to be registered in a tape recorder so that a sampling timing may be changed when the phase of the sampling signal of the phase judging data portion in the data reproduced from the tape recorder is not coincident with a predetermined value.

7 Claims, 7 Drawing Sheets

DATA PROCESSING SYSTEM

BACKGROUND OF THE INVENTION

1. Field of the Invention

The present invention relates to a data processing system and, more particularly, to a data file in a word processor or a personal computer having functions to input, register and read document data or the like.

2. Description of the Prior Art

In a personal word processor or an MSX (i.e., the unified standards for personal computers by Micro Soft and ASCII) personal computer which has seen substantial success as a small-sized documentation system in recent years, a tape recorder (which may be called a data recorder or a cassette tape recorder) is used as one of external memories of a file system.

The FSK (i.e., Frequency Shift Keying) modulation process is generally adopted as a data modulation process when data is to be stored in the tape recorder, because it is highly resistant to noise. The FSK modulation process is a frequency modulation process, by which frequencies are shifted in a manner to correspond to the data "0" and "1", respectively. In a demodulation process, reproduced analog signals from the tape recorder are subjected to A/D (i.e., analog-to-digital) conversion, and the reproduced FSK modulation digital signals are sampled.

Incidentally, the use of an audio cassette tape recorder for filing data is exemplified in Japanese Patent Laid-Open No. 929/1980.

For the demodulation, a sampling is made in the MSX personal computer, for example, noting the pulse width of the A/D converted reproduced FSK demodulation digital signals. Specifically, whether or not the data is at "0" or "1" is judged by grasping the changing points of said reproduced FSK modulation digital binary signals from the high to low levels and the low to high levels to continuously count the time periods of the high and low levels. This sampling method is restricted by a hardware circuitry that said reproduced FSK modulation digital signal corresponding to 1-bit data must have a duty of 50% when the 1-bit data is to be sampled.

However, it is difficult to make said reproduced FSK modulation digital signal of the 1-bit data into a signal of the 50% duty partly because the duty is not the value of 50% if the FSK modulation digital signal of the 1-bit data is D/A (i.e., digital-to-analog) converted when the prepared data is to be stored in the tape recorder, although the FSK modulation digital signal of the 1-bit data can have a substantially constant period, and partly because the reproduced output analog signal from the tape recorder is processed to have hysteresis characteristics so as to prevent the chattering when it is A/D converted into the reproduced FSK modulation digital signal. This raises a problem that the ratio of sampling mistakes increases.

If the data transfer rate is to be improved, there arises another problem of the data sampling time.

Therefore, the inventors of the present invention have tried to solve those problems by grasping either of the changing points of said reproduced FSK modulation digital binary signals from the high to low levels and from the low to high levels to count the changing points and their time periods.

However, the existing tape recorder takes consideration of the recording level and the frequency characteristics but not the phase. Specifically, the tape recorder is divided into two types, in which the phases upon the recording and reproduction are in and opposite. Therefore, the method of grasping only either the changing point of the reproduced FSK modulation digital binary signals from the high to low levels and the low to high points to count the changing points and their time periods is troubled by the phase, and the use of such tape recorder may disable the signals to be correctly sampled. As a result, that sampling is troubled by the fact that it cannot be used except in the tape recorder having a phase inverting switch.

SUMMARY OF THE INVENTION

An object of the present invention is to provide a data processing system which can be used as it is as a data filing system even if magnetic recording devices such as a tape recorder to be used for filing data have their signal phases inverted between data recording and reproduction.

The data processing system according to the present invention is characterized by adding a phase judging data portion for judging the phases of the data recording and reproduction in a magnetic recording device to a data format to be registered in the magnetic recording device so that the phases of the recording and reproduction of the magnetic recording device may be judged by the reading operation of the phase judging data portion to sample the data in accordance with the phases.

DESCRIPTION OF THE PREFERRED EMBODIMENT

Figure 1:
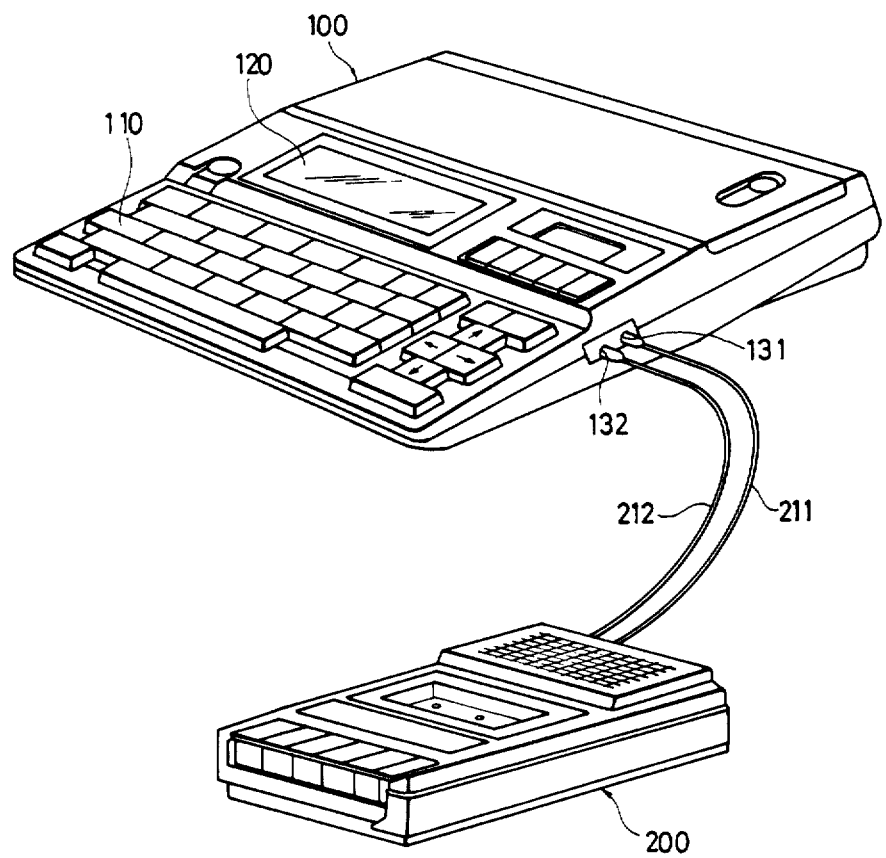
FIG. 1 is a perspective view showing a word processor to which a cassette tape recorder is connected as an external data filing device.

FIG. 1 is a perspective view showing a word processor to which a cassette tape recorder (e.g., and audio cassette tape recorder or a data cassette tape recorder) is connected as an external data filing device.

The word processor 100 is equipped on its surface with a keyboard unit 110, a liquid crystal display 120 and file data input and output terminals 131 and 132 and in its inside with a control unit. The cassette tape recorder 200 is connected through file data input and output lines 211 and 212 with the data input and output terminals 131 and 132.

Figure 2:
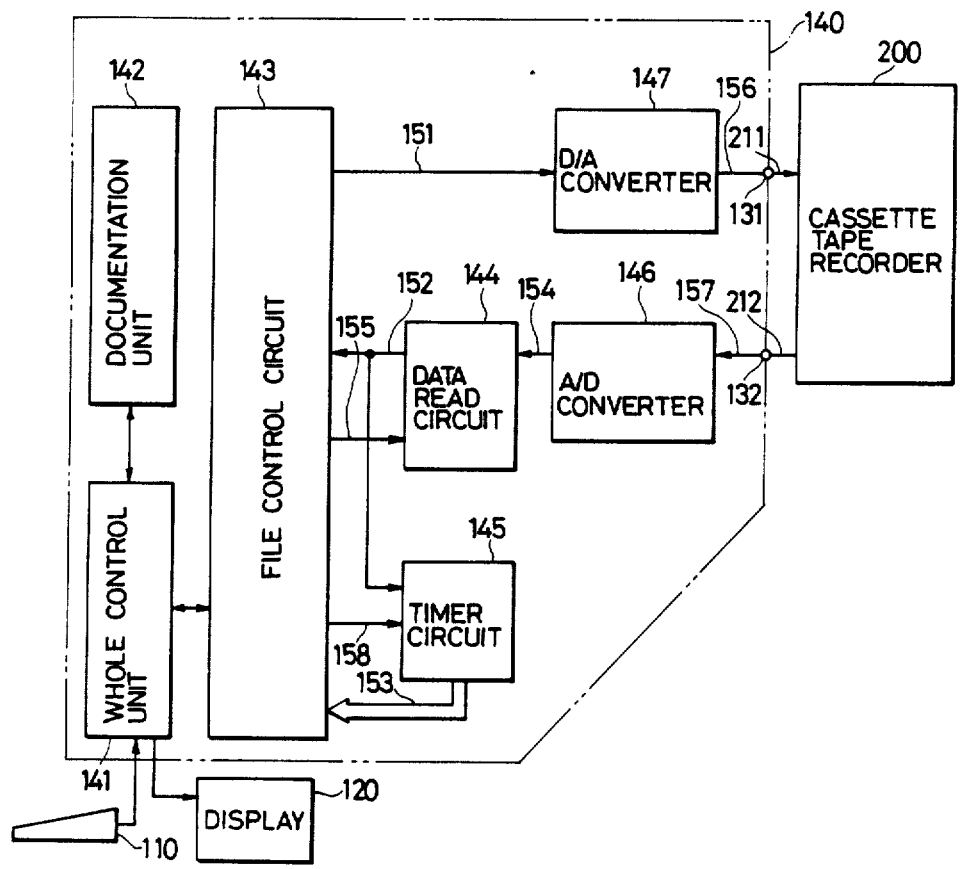
FIG. 2 is a block diagram showing the control unit for the word processor.

FIG. 2 is a block diagram showing the control unit which is generally denoted by 140 and disposed in the word processor 100 shown in FIG. 1.

A whole control unit 141 is constructed of a CPU or the like and made operative to transmit commands and data from the keyboard unit 110 to a known documentation unit 142 to execute a documentation, to control a file control circuit 143 to execute the registration and read of file data in the cassette tape recorder 200, and to start the display 120 to display a document or another message.

The file control circuit 143 is made operative to convert data to be registered in the cassette tape recorder 200 into an FSK modulation digital signal thereby to output it to a signal line 151; to read the timer value data, which is outputted from a timer circuit 145 to a signal line 153, and to output a reset signal for resetting the timer circuit 145 on a signal line 158 in response to a control signal indicating the level change of a signal outputted from a data read circuit 144 to a signal line 152 to reproduce data "0" and "1"; and to output a switch signal to a signal line 155 for outputting the control signal, which is outputted from the data read circuit 144 to the signal line 152 and indicates the change of a signal line, in response to the changes of the reproduced FSK modulation digital signal, which is A/D converted by an A/D converter 146 and outputted to a signal line 154, from high to low levels and from low to high levels.

Reference numeral 147 denotes a D/A converter for D/A converting the FSK modulation digital signal, which is outputted from the control circuit 143 to the signal line 151, into a recording analog signal to output it to a signal line 156. The cassette tape recorder 200 is made operative to record the recording analog signal, which is outputted from the D/A converter 147, in its cassette (magnetic) tape; and to reproduce the data recorded in the cassette tape thereby to output the reproduced analog signal to a signal line 157.

The A/D converter 146 is made operative to A/D convert the reproduced analog signal, which is reproduced by the cassette tape recorder 200 and given to the signal line 157, into the reproduced FSK modulation digital signal thereby to output it to the signal line 154. The data read-in circuit is made operative to output an interruption signal indicating the occurrence of a signal change to the signal line 152 when the signal change designated by the switch signal given from the control circuit 143 via the signal line 155 is caused by the reproduced FSK modulation digital signal outputted from the A/D converter 146.

The timer circuit 145 causes its internal register to latch the count value data, when the interruption signal outputted from the data read circuit 144 to the signal line 152 is inputted, and has the control circuit 143 read out the count value data via the signal line 153. The data read circuit 144 is constructed of a combination of positive and negative differentiation circuits.

Figure 3:
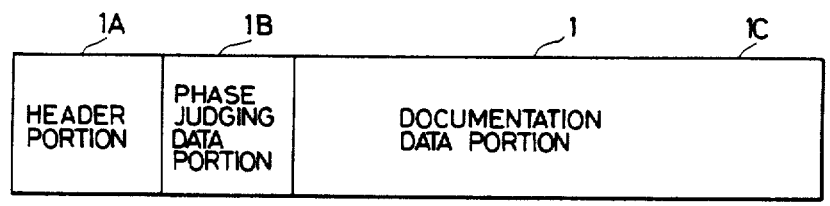
FIG. 3 is a data format.

FIG. 3 is a diagram showing a data format 1 to be handled by the word processor 100. Reference numeral 1A denotes a header portion indicating the head of data; numeral 1B a phase judging data portion for judging the reproduction phases of the tape recorder used; and numeral 1C a document data portion composed of document administration data and document data.

FIGS. 4(a)-4(g) are timing charts showing the data to be registered in and read out from the cassette tape recorder 200.

Figure 4:
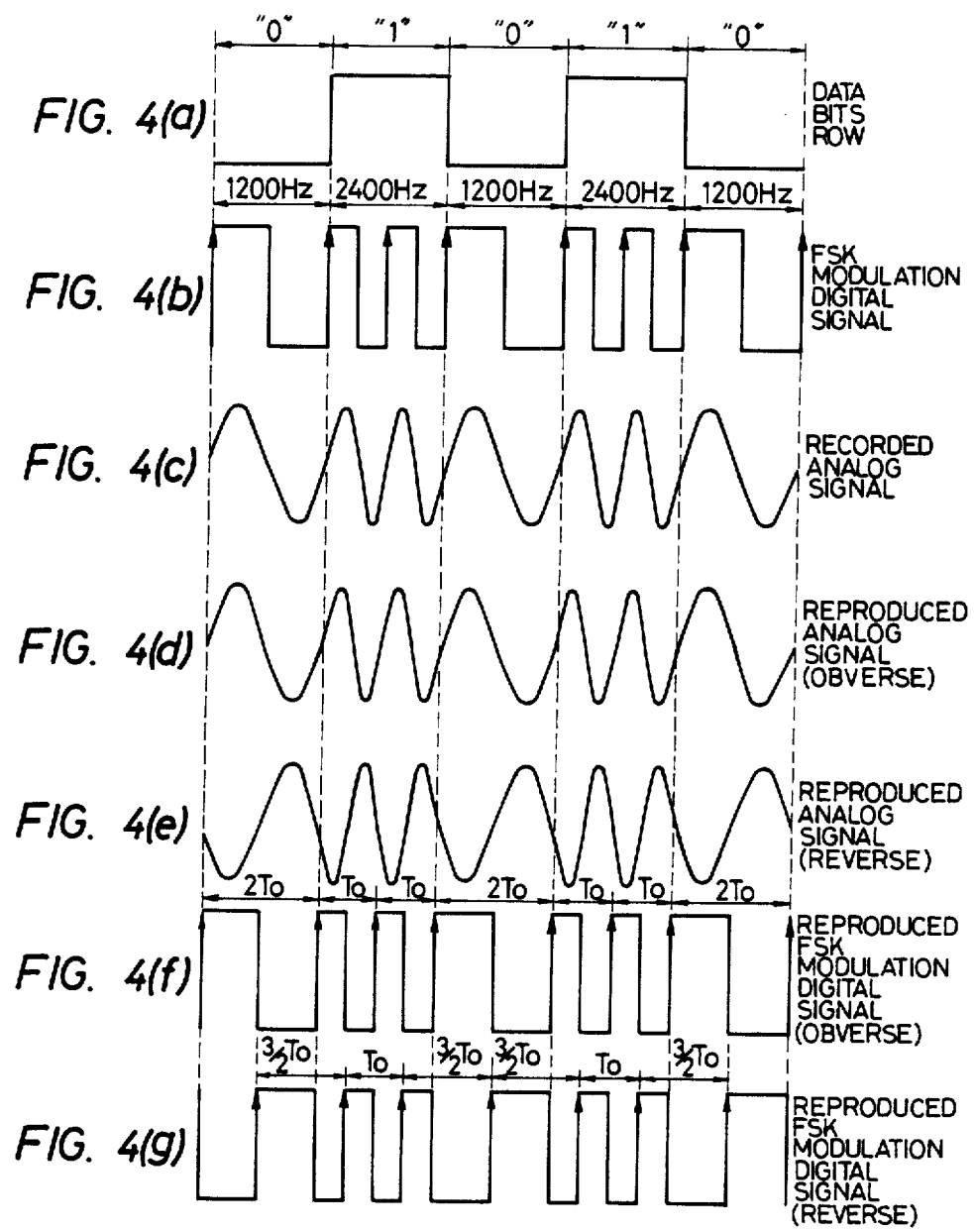
FIGS. 4(a)–4(g) are timing charts of signals.

FIG. 4(a) shows the row "0", "1", "0", "1" and "0" of file data bits to be registered in the cassette tape recorder.

FIG. 4(b) shows the FSK modulation digital signals which have been FSK modulated by the control circuit 143 from the data (a) to be registered in the cassette tape recorder. In other words, in the present embodiment, the data "0" is shifted to one wave of the frequency 1,200 Hz whereas the data "1" is shifted to two waves of the frequency 2,400 Hz.

FIG. 4(c) shows the recorded analog signals which have been D/A converted from the FSK modulation digital signals (b) by the D/A converter 147.

FIG. 4(d) shows the reproduced analog signals which have been recorded from the recorded analog signals (c) by the tape recorder having an identical phase between the recording and reproduction and reproduced by the same tape recorder.

FIG. 4(e) shows the reproduced analog signals which have been recorded from the recorded analog signals (c) by the tape recorder having the phases inverted between the recording and reproduction and reproduced by the same tape recorder.

FIG. 4(f) shows the reproduced FSK modulation digital signals which have been A/D converted from the reproduced analog signals (d) by the A/D converter 146.

FIG. 4(g) shows the reproduced FSK modulation digital signals which have been A/D converted from the reproduced analog signals (e) by the A/D converter 146. Here, the period of the waves of 2,400 Hz is denoted by To, and consideration is taken into the time interval between the rising changes of the FSK modulation digital signals (f) and (g).

Then, the rising time intervals between the FSK modulation digital signals (b) and the reproduced FSK modulation digital signals (f) are "2To", "To", "To", "2To", "To", "To" and "2To". On the contrary, the rising time intervals of the reproduced FSK modulation digital signals (g) are "3/2To", "To", "3/2To", "3/2To", "To" and "3/2To" so that they are different from those of the FSK modulation digital signals (b).

As a result, the data once registered in the cassette tape cannot be correctly read if the time intervals between the signal rising changes are as noted. Nor is it possible to correctly read the data which has been stored in the tape recorder having different phases between the recording and reproduction, if the time intervals between the signal falling changes are noted.

Figure 5:
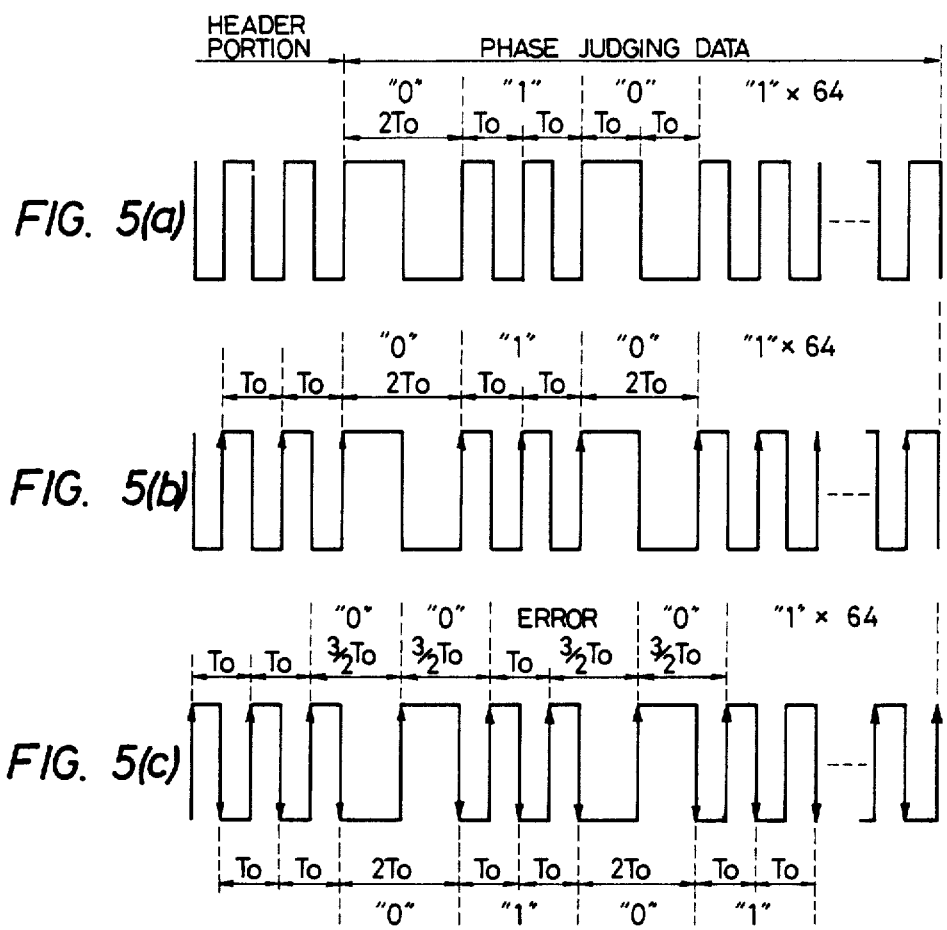
FIGS. 5(a)–5(c) are timing charts of signals.

FIG. 5(a) shows the FSK modulation digital signals which have been FSK modulated by the control circuit 132 from the rear half of the header portion and the phase judging data portion of the file data to be registered in the tape recorder. The header portion is composed of rectangular waves of 2,400 Hz, and the phase judging data portion is composed of data of "0", "1", "0" and "1"×64. The phase judging data portion is composed of a thrice-repeated pattern of the phase judging data.

FIG. 5(b) shows the reproduced FSK modulation digital signals which are obtained by reproducing the rear half of the header portion and the phase judging data portion, which have been registered in the tape recorder having the identical phase between the recording and reproduction, and by A/D converting them by the A/D converter 146.

FIG. 5(c) shows the reproduced FSK modulation digital signals which are obtained by reproducing the rear half of the header portion and the phase judging data portion, which have been registered in the tape recorder having their phases inverted between the recording and reproduction and by A/D converting the same by the A/D converter 146.

Figure 6:
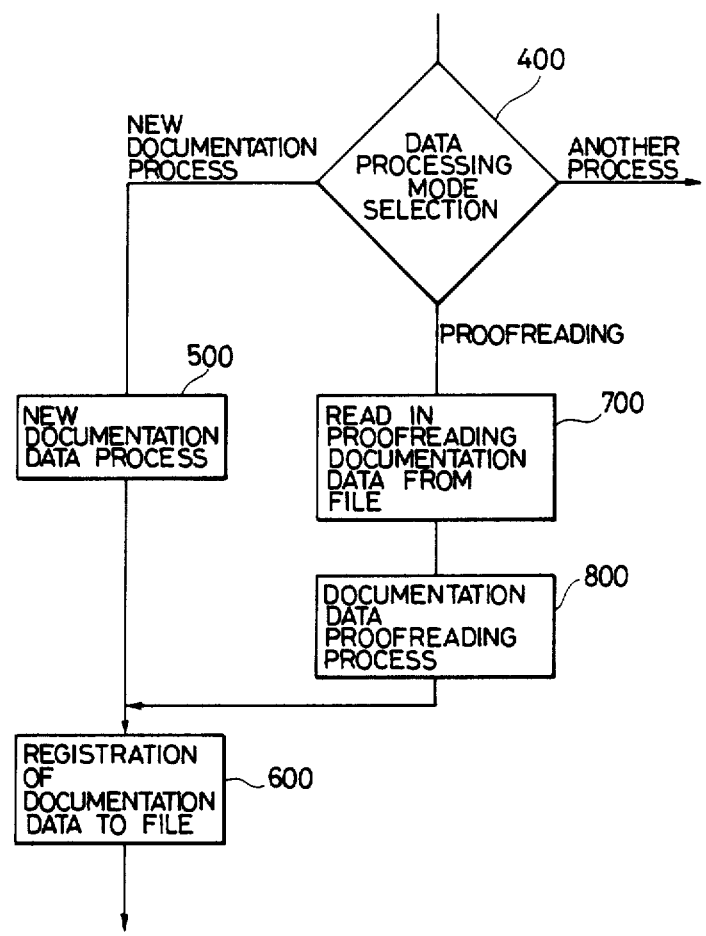
FIG. 6 is data processing flow charts.

FIG. 6 is a flow chart showing the control processes of the whole control circuit 141 in the word processor 100. At a processing block 400, it is discriminated whether the selected input of a data processing mode from the keyboard unit 110 is a new documentation process, a proofreading process of a prepared document or another process. In the case of the new documentation process, the block is shifted to a processing block 500, at which the new documentation process is executed by making use of the keyboard unit 110, the display 120 and the documentation unit 142. When the documentation data thus prepared is to be registered in the tape recorder 200, the block is shifted to a processing block 600 at which the registration process is executed. This registration process will be described in detail hereinafter.

In the case of the proofreading process of the prepared document, the processing block is shifted from 400 to 700, at which the data of the prepared document is read in from the tape recorder 200. This read-in process will be described in detail hereinafter. At a processing block 800, the proofreading process of the document data thus read in is executed. After this proofreading process, the processing block is shifted to 600, at which the registering process of the proofread document data is executed.

The detailed explanations of the data processing procedures at the blocks 400, 500 and 800 are omitted here because they are identical to those of the wellknown word processor.

Figure 7:
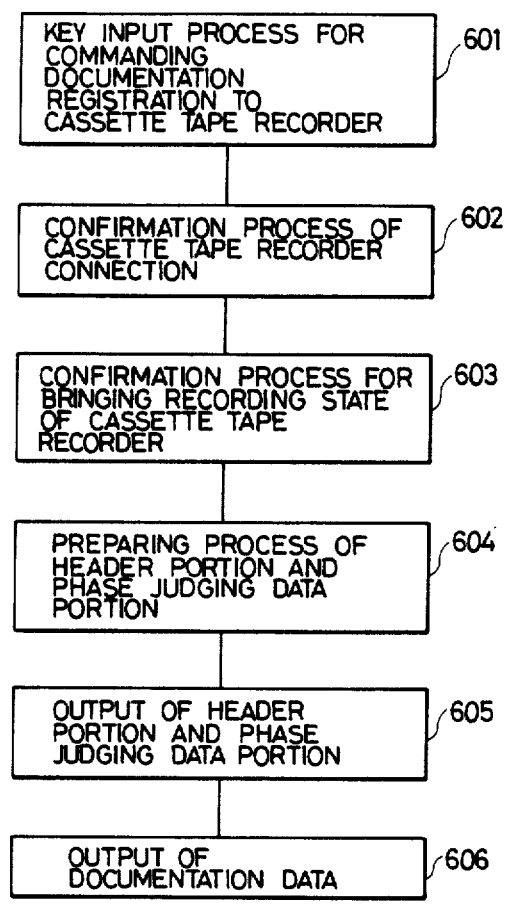
FIG. 7 is data processing flow charts.

FIG. 7 is a block diagram showing the detail of the processing block 600 when the document data is to be registered in the tape recorder 200. If a registration command of the document data is inputted at a processing block 601, the processing block is shifted to 602, at which it is confirmed that the tape recorder 200 is connected with the data output terminal 131 of the word processor 100.

In this process, the operator confirms that the tape recorder 200 is connected with the data output terminal 131 so that a message for inputting a confirmation key is displayed in the display unit 120 to subsequently check for the existence of the input of the confirmation key. If the connection of the tape recorder 200 is confirmed, the processing block is shifted to 603, at which a process for bringing said tape recorder 200 into a recording state is executed.

In this process, a message for causing the operator to set said tape recorder 200 in the recording state and to subsequently input the confirmation key is displayed in the displayed unit 120, and the existence of the input of the confirmation key is checked.

After the connected and operating states of the tape recorder 200 have been confirmed in those ways, the processing block is shifted to 604, at which the process of preparing the header portion 1A and phase judging data portion 1B of the file data is executed. Then, at a processing block 605, the header portion 1A and the phase judging data portion 1B are outputted to the file control circuit 143. This file control circuit 143 converts those portions 1A and 1B into the FSK modulation digital signals, which are further converted into recorded analog signals by the D/A converter 147 and transmitted to the cassette tape recorder 200.

After the header portion 1A and the phase judging data portion 1B have been outputted, the processing block is shifted to 606, at which the document data is outputted and transmitted to the cassette tape recorder 200.

Figure 8:
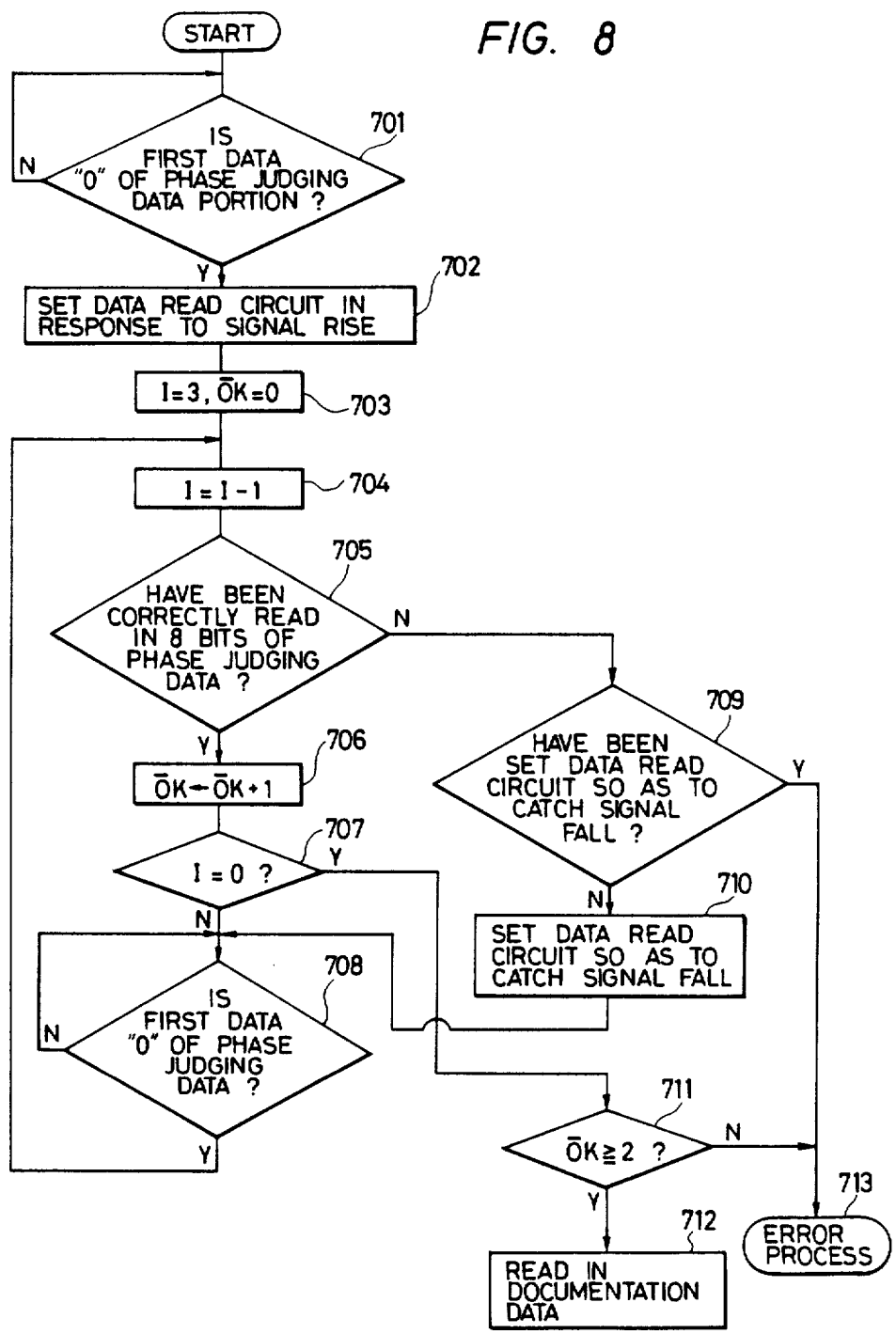
FIG. 8 is a block diagram showing the detail of the file data read process of the processing block.

FIG. 8 is a block diagram showing the detail of the file data read process of the processing block 700. When the cassette tape recorder 200 starts its reproducing operation to input the reproduced analog signals to the signal line 212, the data input terminal 132 and the signal line 157, the A/D converter 146 converts them into the reproduced FSK modulation digital signals to output the same to the signal line 154. The data read circuit 144 outputs and interruption signal to the signal line 152 in response to the rise or fall of those reproduced FSK modulation signals. The file control circuit 143 generates the data row "0" and "1" from the interval of that interruption signal and inputs it to the whole control unit 141.

After having detected the header portion 1A, the whole control unit 141 is shifted to a processing block 701, at which it hunts the first data "0" of the phase judging data portion 1B. The whole control unit 141 is shifted, if it catches the first data of the phase judging data portion 1B, to a processing block 702, at which it sets the data read circuit 144 so that this circuit 144 may generate the interruption signal in response to the rise of the reproduced FSK modulation digital signals. After that, the whole control unit 141 is shifted to a processing unit 703, at which it sets the register I at 3 and the register OK at 0.

Then, the whole control unit 141 is shifted to a processing block 704, at which it subtracts 1 from the register I. Next, the whole control unit 141 is shifted to a processing block 705, at which it checks whether or not the first 8 bits of the phase judging data portion 1B have been correctly read in. If YES, the whole control unit 141 is returned via processing blocks 706, 707 and 708 to the processing block 704 to subsequently check whether or not the phase judging data has been correctly read continuously two times.

In case the first 8 bits of the phase judging data 1B have not been correctly read, the whole control unit 141 is shifted to a processing block 709, at which it checks whether or not the data read circuit 144 has been set to generate the interruption signals in response to the fall of the reproduced FSK modulation digital signals. If NO, the whole control unit 141 is shifted to a processing block 710, at which it sets the data read circuit 144 so that the circuit 144 may generate the interruption signals in response to the fall of the reproduced FSK modulation digital signals, until it is returned to the processing block 708.

After that, the whole control unit 141 checks whether or not the phase judging data have been correctly read in continuously two times. After these three checking process, the whole control unit 141 is shifted to a processing block 711, at which it checks whether or not the value of the register OK is two or more. If YES, the whole control unit 141 is shifted to a processing block 712, at which it reads in the document data 1C coming later.

In case the value of the register OK is two or less and in case the phase judging data have not been correctly read in even if the data read circuit 144 is set to generate the interruption signals in response to the fall of the reproduced FSK modulation digital signals, the whole control unit 141 is shifted to a processing block 713, at which it executes the error process.

In the present embodiment, the data read circuit 144 is first set to respond to the fall of the reproduced FSK modulation digital signals, and the subsequent data reading operation is continued as it is if the data are correctly read in the set state. If NO, the data read circuit 144 is reset to respond to the fall of the reproduced FSK modulation digital signals. Despite of this fact, however, this setting order may be reversed.

Moreover, the present invention can be similarly applied to a small-sized personal computer.

What is claimed is:

1. In a data processing system for use with a magnetic recording device serving as a data filing device for storing document data, the improvement comprising:
   (a) first means for generating a first signal representing document data to be recorded by said magnetic recording device;
   (b) second means connected to said first means for generating a second signal representing a header and a third signal of predetermined format representing phase judging data to be used to determine whether the phase of recording given document data by said magnetic recording device is the same as the phase of reproducing the same given document data by said magnetic recording device, and including means for appending said second and third signals in front of said first signal to produce a composite signal;
   (c) third means coupled to said second means for sending said composite signal to said magnetic recording device for storage;
   (d) fourth means for receiving a reproduced composite signal from said magnetic recording device;
   (e) fifth means coupled to said fourth means for reading said reproduced composite signal with a timing having a first phase relationship to said signal or with a timing having a second phase relationship to said signal;
   (f) sixth means coupled to said fifth means for detecting the portion of said reproduced composite signal formed by said third signal and for determining whether said third signal portion has said predetermined format; and
   (g) seventh means coupled to said fifth means and said sixth means for controlling said fifth means to switch the phase relationship of the timing of reading of said reproduced composite signal by said fifth means when said sixth means detects that said third signal portion of said reproduced composite signal does not have said predetermined format.

2. A data processing system according to claim 1, wherein said composite signal produced by said second means is an FSK modulated signal, and wherein said fifth means includes means for detecting the time width between rising edges of said reproduced composite signal as said first phase relationship and for detecting the time width between falling edges of said reproduced composite signal as said second phase relationship.

3. A data processing system according to claim 2, wherein said sixth means includes means responsive to the time width detected by said fifth means with respect to said third signal portion of said reproduced composite signal for determining whether said third signal portion has said predetermined format.

4. A data processing system according to claim 2, wherein said second means includes means for generating said third signal with a predetermined format which provides a different data content when its phase is inverted.

5. A data processing system according to claim 2, wherein said second means includes means for generating said third signal with a predetermined format which provides a different time width pattern between rising edges than it does between falling edges thereof.

6. A data processing system according to claim 2, wherein said third means includes means for converting said FSK modulated composite signal to analog form for recording by said magnetic recording device.

7. A data processing system according to claim 6, wherein said fourth means includes means for converting said reproduced composite signal from analog to digital form.

* * * * *